April 7, 1936.    P. L. BANNAN    2,036,389
GEAR UNIT
Filed Oct. 10, 1932
Fig. 1
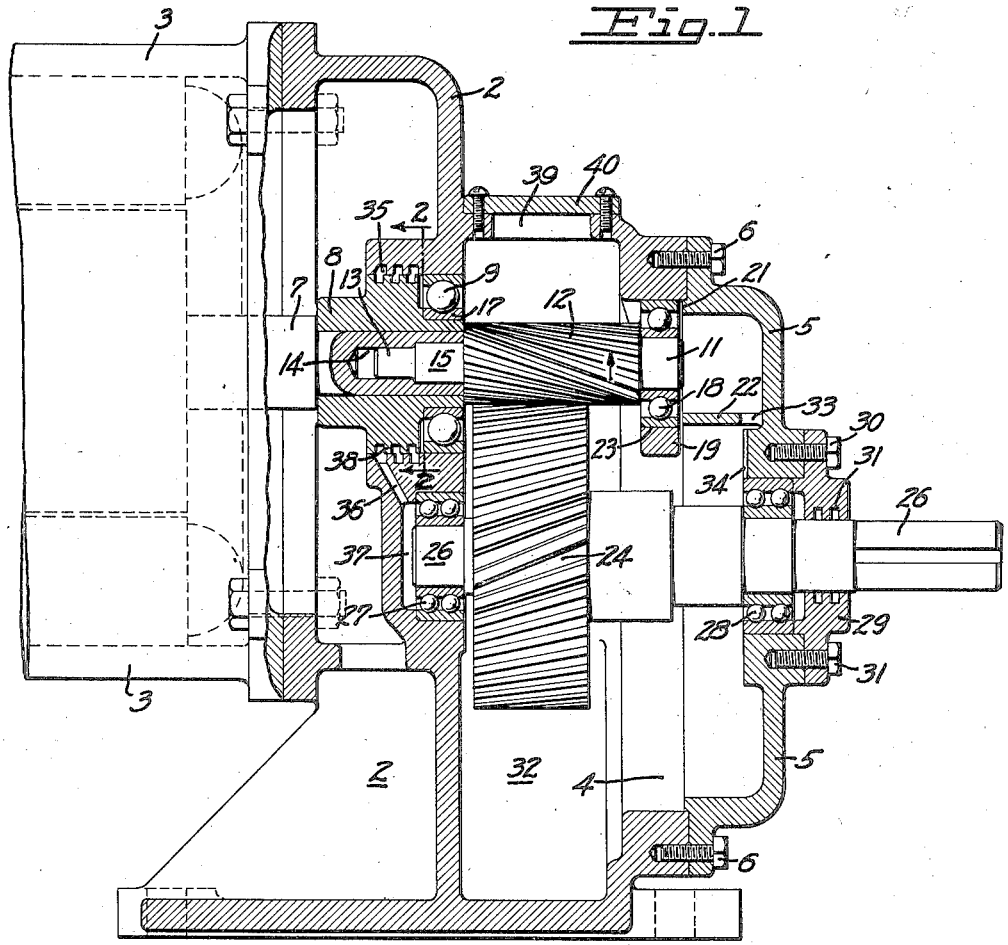
Fig. 2
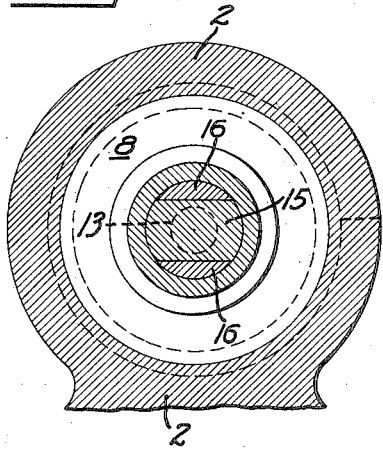
Fig. 3
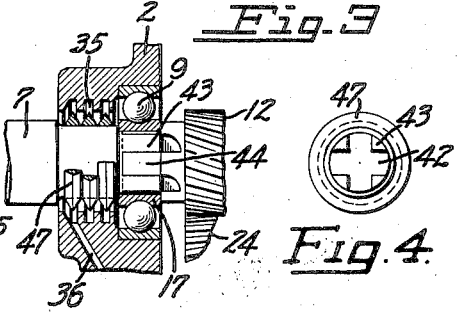
Fig. 4
INVENTOR.
PHILIP L. BANNAN
BY Charles S. Evans
HIS ATTORNEY Patented Apr. 7, 1936

2,036,389

UNITED STATES PATENT OFFICE 2,036,389

GEAR UNIT

Philip L. Bannan, San Francisco, Calif., assignor to Pacific Gear and Tool Works, San Francisco, Calif., a corporation of California Application October 10, 1932, Serial No. 637,022

3 Claims. (Cl. 74—421)

My invention relates to a gear unit, and more particularly to a unit in which the speed ratio is altered by replacing the gears with others of different pitch diameter.

It is among the objects of my invention to provide a gear unit of the character described in which the gears may be readily changed.

Another object of my invention is to provide an improved coupling means between separable parts of my mechanism, to permit assembly and disassembly of the parts.

Another object of my invention includes the provision of a gear unit having an improved oiling system.

The invention possesses other objects and features of advantage, some of which, with the foregoing, will be set forth in the following description of my invention. It is to be understood that I do not limit myself to this disclosure of species of my invention, as I may adopt various embodiments thereof within the scope of the claims.

Referring to the drawing:

Figure 1 is a side view, partly in section and partly in elevation, showing the gear unit embodying my invention.

Figure 2 is a detail vertical sectional view taken in a plane indicated by the line 2—2 of Figure 1, showing the coupling between the drive shaft and its pinion.

Figure 3 is a vertical sectional view of a modified form of the coupling structure shown in Figure 1; and Figure 4 is an end view of the motor shaft as constructed for the coupling shown in Figure 3, and with slinger rings attached.

In terms of broad inclusion, the gear unit embodying my invention comprises a housing, one end of which is normally closed by a demountably secured plate, carrying a bearing. A drive shaft is journaled in the end of the housing opposite the end plate; and a removably positioned pinion is journaled in the housing and connected for rotation with the drive shaft within a bearing supporting both, by a stud and socket coupling, which is separable by mere withdrawal. The coupling also provides a slight but very necessary degree of flexibility. The pinion bearing opposite the coupling is slidably mounted in the housing; the pinion together with its bearing being adapted for insertion into the housing through the opening normally covered by the end plate. A second gear is also removably mounted in the housing and is positioned to mesh with the pinion, one end being journaled in the housing and the other end journaled in the bearing of the end plate. By this arrangement the gears are readily removed and replaced through the housing opening upon removal of the end plate, so that if a different gear ratio is required, the change may be effected within a few moments, and without special tools. Further advantages lie in the use of a motor having a standard shaft instead of a specially extended one; and also in the fact that a wide choice of speed ratios are quickly available by substitution of only the interchangeable gears and gear shafts, thus making it unnecessary for the manufacturer to keep available a large variety of patterns, or the dealer to carry in stock a large assortment of parts.

The gears are preferably provided with helical teeth to insure the smooth running of the unit, and advantage is taken of the helical formation of the teeth to assist in the lubrication of the mechanism. The housing is preferably constructed to provide a reservoir for oil at the bottom thereof. The helical gear coupled with the drive shaft is journaled in the upper portion of the housing, but the other helical gear is journaled in the lower portion of the housing so that it dips into the oil. The lower gear is positioned adjacent one of the upper gear bearings so that oil carried up by the lower gear floods out between the gears and upon the adjacent bearing. Rotating in the direction indicated by the arrow, the helical teeth of the upper gear throw off oil laterally to its other bearing. Means are also provided for directing the flow of oil from the upper gear bearings to the lower gear bearings. In addition, oil is thrown or splashed by the rapidly running gears upon the walls of the housing, draining down into the bearings, so that abundant lubrication at all times is assured.

In greater detail, the gear unit embodying my invention comprises a housing 2, which may be connected as shown directly with a motor housing 3, and which replaces the bearing cage with which the motor is normally furnished. The housing 2 is provided with an opening 4 at the end opposite the motor, normally closed by a cover or end plate 5, preferably bell-shaped and demountably secured to the housing by screws 6.

A drive shaft 7, which may conveniently be the motor shaft, is arranged to project into the end of the housing 2 opposite the opening 4, and may be provided with a hub 8 which is journaled in the housing in a suitable bearing 9, which thus takes the place of the bearing in the discarded bearing cage. A shaft 11 carrying a relatively wide faced driving pinion 12 is also removably positioned in the housing 2; the inner end of the shaft being supported in and detachably coupled with the drive shaft 7. As shown in Figure 1, this coupling may comprise a reduced end portion or centering pin 13 on the pinion shaft 11, adapted to seat in a complementary recess 14 centrally formed in the drive shaft 7, and a flattened key or stud 15 on the pinion shaft engaged between jaws 16 formed on the end of the drive shaft, by a slot cut thereacross. It will be observed that the interlocked key and jaw portions of the coupling are surrounded by that portion of the hub which is within the inner ring 17 of the bearing, so that spreading of the jaws is impossible, and both motor and pinion shafts find direct support in the bearing.

The outer end of the pinion shaft 11 is journaled in a bearing 18, slidably mounted in a bracket 19, formed in the housing 2, adjacent its opening 4. The bearing 18 is held against outward movement when the unit is assembled by the upper portion 21 of the end plate 5 and a flange 22 extending horizontally across the end plate. The aperture 23 of the bracket 19 which receives the bearing 18, is of sufficient size to permit the insertion therethrough of the different sizes of drive pinions contemplated in the unit.

A gear 24 of relatively less width than the pinion 12 is also removably positioned in the housing and is arranged to mesh with the pinion 12 as shown in Figure 1. The gear 24 is carried on a shaft 26, which projects through the end plate 5, and which is journaled at its inner end in a bearing 27, mounted in the housing 2; and at its outer end in a bearing 28, mounted in the end plate. Preferably the gears are made with helical teeth to insure quiet operation of the unit. A collar 29 secured to the end plate 5 by suitable screws 30, is preferably arranged about the shaft 26 and over the bearing 28. Grease retaining grooves 31, are provided in the collar 29 to prevent the egress of lubricant; or these grooves may be filled with felt for the same purpose.

The bearings employed in my gear unit may be of any suitable construction, the ball type illustrated being preferred. Bearings 9, 27 and 28 may conveniently be pressed into their mountings to fix their position, but the bearing 18 is slidably mounted to facilitate the gear replacement.

From the above it will be understood that the exchange or replacement of gears may be readily accomplished, and by operations which are easily and rapidly performed. The screws 6 are first removed; and then the end plate 5 slipped off the end of the shaft 26. This frees the latter shaft so that it may be withdrawn from its bearing 27, and then lowered and passed out through the housing opening under the bracket 19. The outer bearing 18 of the pinion 12 is then withdrawn by sliding it out of its seat. This frees the pinion 12 so that it may be slipped out of engagement with the drive shaft 7, and withdrawn through the opening 23 of the bracket 19. A new set of gears may then be inserted by reversing these operations.

An improved oiling system is also provided in the gear unit embodying my invention. The lower portion of the housing 2 is formed to provide a reservoir 32 for lubricating oil; and the gear 24 is arranged below the pinion 12 so that its lower parts are immersed in the oil. When the gears are running the lower gear 24 will carry oil to the pinion from which it surges out to the lower portion of the bearing 9. From both gear and pinion oil is thrown into the adjacent bearings, or upon the walls of the housing so that it runs down into the bearings. Owing to the helical teeth in the pinion and its direction of movement, oil is also thrown laterally to the bearing 18.

Means are also provided for directing the flow of oil from the pinion bearings to the lower gear bearings. As the oil passes through the pinion bearing 18 it is deposited on the flange 22 of the end plate 5. An aperture 33 formed in the flange provides a drain through which the collected oil may flow to a groove 34, formed in the end plate, and thence to the bearing 28.

The oil which passes through the other pinion bearing 9 is prevented from entering the motor housing by the grooves 35 cut in the housing 2, and the last one of which is connected by a duct 36 with the chamber 37 behind the bearing 27. Flanges 38 cut on the hub 8 throw oil gathering on the hub into the grooves 35. By this arrangement the several bearings in the gear unit are effectively oiled during the operation of the mechanism. A suitable aperture 39 normally closed by a cover plate 40 is preferably provided in the housing for quick inspection of the gears and for introduction of the oil.

In Figures 3 and 4, is shown a modification of my coupling structure which differs from that explained above by the fact that cross slots 42 are cut in the driving shaft 7 to provide four equally circumferentially spaced jaws 43, between which is seated a cruciform or 4-part key or stud 44, formed on the end of the pinion shaft. Since this construction of coupling is inherently self centering, no pinion shaft center pin is needed in connection with motor shaft recess, as provided in the structure first explained. In this construction, the motor shaft hub is also dispensed with, the end of the shaft 7 being preferably reduced in two steps, the second or smallest fitting directly into the inner ring 17 of the bearing, and the first step carrying the slinger rings 41 which function in the same fashion as the flanges 38 to throw oil into the grooves 35.

In both the coupling structures explained there is a very small degree of flexibility, obtained by the character of the fit between the parts. If exact rigidity in the coupling were secured, it would require a difficult and expensive precision of alignment in the three closely spaced bearings of motor and pinion shafts. Therefore a very slight play is left between the key and jaw parts of the coupling, not perceptible in handling, but yet sufficient to provide the flexibility required for smooth and quiet running of the shafts in bearings which are aligned within practical limits.

I claim:

1. A gear unit comprising a housing open at one end, a cover plate removably mounted on said open end, a drive shaft journalled in the opposite end of the housing, a shaft in the housing axially aligned with the drive shaft, a pinion on the latter shaft, coupling means on the inner ends of said shafts engageable by axial movement of the pinion shaft, a bearing bracket fixed in the housing adjacent the cover plate for supporting the outer end of the pinion shaft and having an aperture larger than the pinion and through which the pinion and its shaft may be inserted through the open end of the housing, and a bearing slidably mounted in the bracket aperture and providing a journal for the outer end of the pinion shaft.

2. A gear unit comprising a housing open at one end, a cover plate removably mounted on said open end, a drive shaft journalled in the opposite end of the housing, a shaft in the housing axially aligned with the drive shaft, a pinion on the latter shaft, coupling means on the inner ends of said shafts engageable by axial movement of the pinion shaft, a bearing bracket fixed in the housing adjacent the cover plate for supporting the outer end of the pinion shaft and having an aperture larger than the pinion and through which the pinion and its shaft may be inserted through the open end of the housing, a bearing slidably mounted in the bracket aperture and providing a journal for the outer end of the pinion shaft, and means for holding the bearing against outward movement.

3. A gear unit comprising a housing open at one end, a cover plate removably mounted on said open end, a drive shaft journalled in the opposite end of the housing, a shaft in the housing axially aligned with the drive shaft, a pinion on the latter shaft, coupling means on the inner ends of said shafts engageable by axial movement of the pinion shaft, a bearing bracket fixed in the housing adjacent the cover plate for supporting the outer end of the pinion shaft and having an aperture larger than the pinion and through which the pinion and its shaft may be inserted through the open end of the housing, a bearing slidably mounted in the bracket aperture and providing a journal for the outer end of the pinion shaft, and a second gear in the housing meshed with said pinion and also insertable through the open end of the housing, whereby said gear and pinion may be replaced by others to provide a different gear ratio.

PHILIP L. BANNAN.